United States Patent
Iwamura

(10) Patent No.: US 6,188,010 B1
(45) Date of Patent: Feb. 13, 2001

(54) MUSIC SEARCH BY MELODY INPUT

(75) Inventor: Ryuichi Iwamura, San Diego, CA (US)

(73) Assignees: Sony Corporation, Tokyo (JP); Sony Electronics, Inc., Park Ridge, NJ (US)

( * ) Notice: Under 35 U.S.C. 154(b), the term of this patent shall be extended for 0 days.

(21) Appl. No.: 09/429,260

(22) Filed: Oct. 29, 1999

(51) Int. Cl.⁷ .............................. G09B 15/04; G10H 1/26
(52) U.S. Cl. ............................................ 84/609; 84/477 R
(58) Field of Search .................... 84/609–614, 634–638, 84/477 R, 478; 434/307 A

(56) References Cited

U.S. PATENT DOCUMENTS

| | | |
|---|---|---|
| 5,402,339 | 3/1995 | Nakashima et al. . |
| 5,670,730 * | 9/1997 | Grewe et al. ........................... 84/609 |
| 5,739,451 | 4/1998 | Winsky et al. . |
| 5,864,868 * | 1/1999 | Contois ............................... 84/609 X |
| 5,895,876 * | 4/1999 | Moriyama .............................. 84/609 |
| 5,925,843 * | 7/1999 | Miller et al. ........................... 84/609 |
| 5,969,283 * | 10/1999 | Looney et al. ......................... 84/609 |
| 5,986,200 * | 11/1999 | Curtin .................................. 84/609 |
| 6,031,174 * | 2/2000 | Takabayashi ........................... 84/609 |

OTHER PUBLICATIONS

MIDISOFT Desktop Sheet Music 2.0 and MIDISOFT Studio 6.0 http://www.midisoft.com/upgrade.htm Apr. 10, 1999.

* cited by examiner

Primary Examiner—Stanley J. Witkowski
(74) Attorney, Agent, or Firm—Blakely, Sokoloff, Taylor & Zafman LLP

(57) ABSTRACT

A method to enable one to search for a song title when only its melody is known. An interface is used which allows the user to enter the melody in an easy to understand manner. A remote music database with melody information is searched for the melody entered by the user. using, for example, a peak or differential matching algorithm. Upon receiving a search request, a database server, i.e., a remote computer, which can be accessed by the user via a client PC, sends a web page, for example, in HTML or Java containing the search results to the client PC. The client PC receives and displays the search results on the monitor and exchanges data with the server. Sound may also be played through the sound card to connected speakers.

40 Claims, 8 Drawing Sheets

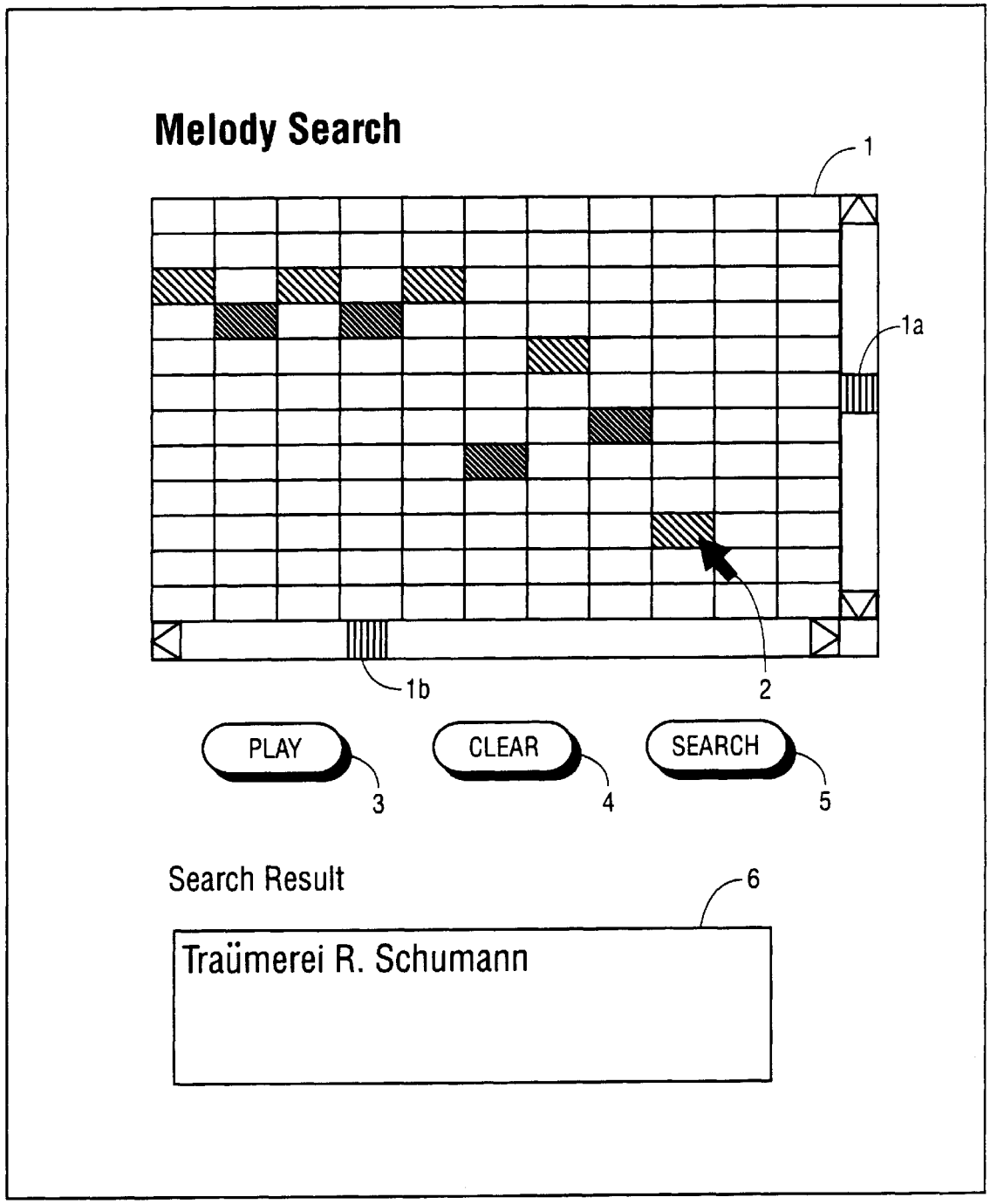
FIG. 1 SEARCH WINDOW

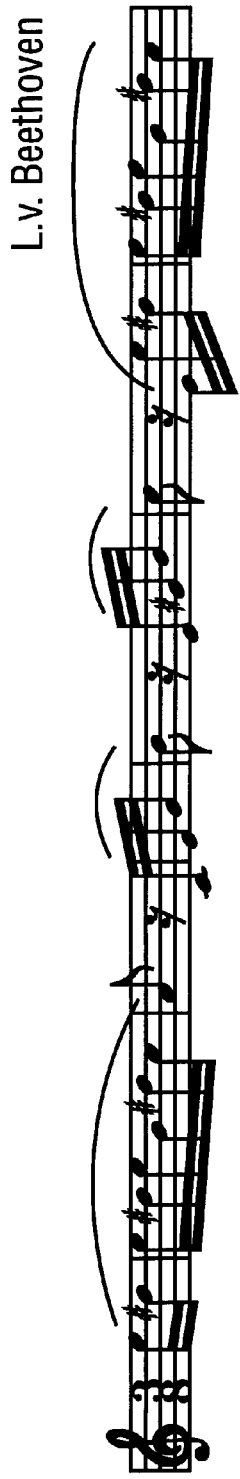
FIG. 2 Für Elise — L.v. Beethoven
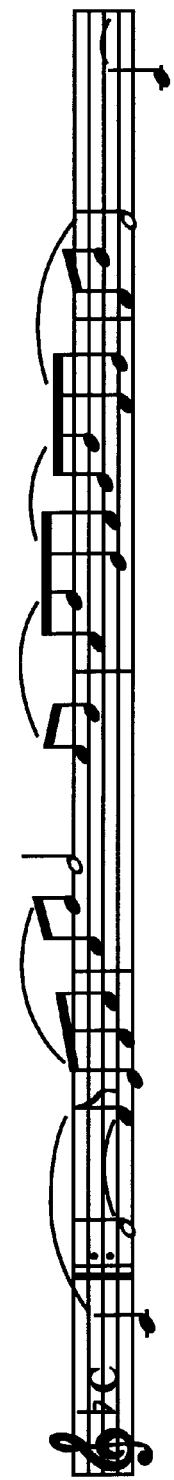
FIG. 3 Träumerei — R. Schumann, Op.15, No.7

PIANO ROLL WINDOW (FUR ELISE)

PIANO ROLL WINDOW (TRAUMEREI)

MUSIC SEARCH BY MELODY INPUT

BACKGROUND OF THE INVENTION

1. Field of the Invention

The present invention is directed to a mechanism for enabling the searching of songs by their melodies in sound files such as midi files.

2. Description of the Related Art

In the prior art, if one knows a song melody, but not the artist or title, about the only way to determine the title would be to ask a person having knowledge of the melody and title such as a person who works in a retail record/compact disc store. Existing music search capability available utilizing the Internet usually requires at least a part of its title or composer's name.

In U.S. Pat. No. 5,739,451, a hand held music reference device is described with song segments, typically stored as compressed MIDI files, as well as titles, lyrics, artists and the like. However, searching is generally performed by entering at least one of the title, lyrics, artist or the like which is then searched. Reference is made to note structure comparator 62 and performing a melody line search utilizing a note structure entered via directional keys. A note structure is defined as a series of relative note or pitch values, i.e., a melody line which is rising, falling or remaining the same in pitch value. Comparator 62 operates to locate songs which have the inputted note structure. Apparently, comparator 62 is a microprocessor which has been programmed to perform this function, the details of which are not set forth as searching by note structure does not appear to be the preferred mechanism for performing a search. Also, the entering of a note structure as described in this patent provides a limited mechanism for enabling the comparator to locate a desired song since basing a search on rising, falling or remaining the same pitch values provides only limited information.

In U.S. Pat. No. 5,402,339, a more sophisticated mechanism is described for performing a search based on a melody. However, to perform the search, a user must enter a string of note data items which is a period and scale level of a single sound identified by a musical note. To do this, the user must possess a high level of music knowledge and sophistication, making the described mechanism unsuitable for use by the average person having a limited knowledge of music. Further, period, i.e., note duration is very difficult to estimate, even for a user having a high level of music knowledge.

SUMMARY OF THE INVENTION

A method and apparatus is disclosed to enable one to search for a song title when only its melody is known. The invented music search allows a user to search a database and thereby obtain the title of the work only with its melody as input to a search engine and a minimal knowledge of music. The invention uses a piano roll music notation interface or a piano keyboard interface which allows the user to enter the melody in an easy to understand manner. This invention assumes a user has access to a remote music database through, for example, the Internet using a personal computer (PC) which functions as a client, with a PC keyboard, monitor, preferably a sound card, optionally a microphone and Internet or other network connection. Upon receiving a search request, the database server i.e., a remote computer, which can be accessed by the user via the client PC, sends a web pages for example, in HTML or Java containing the search results to the client PC. The client PC receives and displays the search results on the monitor and exchanges data with the server. Sound may also be played through the sound card to connected speakers.

BRIEF DESCRIPTION OF THE DRAWINGS

FIG. 1 shows a piano roll grid onto which a melody may be entered.

FIG. 2 is a portion of the work entitled Für Elise in standard music notation.

FIG. 3 is a portion of the work entitled Träumerei in standard music notation.

DETAILED DESCRIPTION OF THE INVENTION

Figure 4:
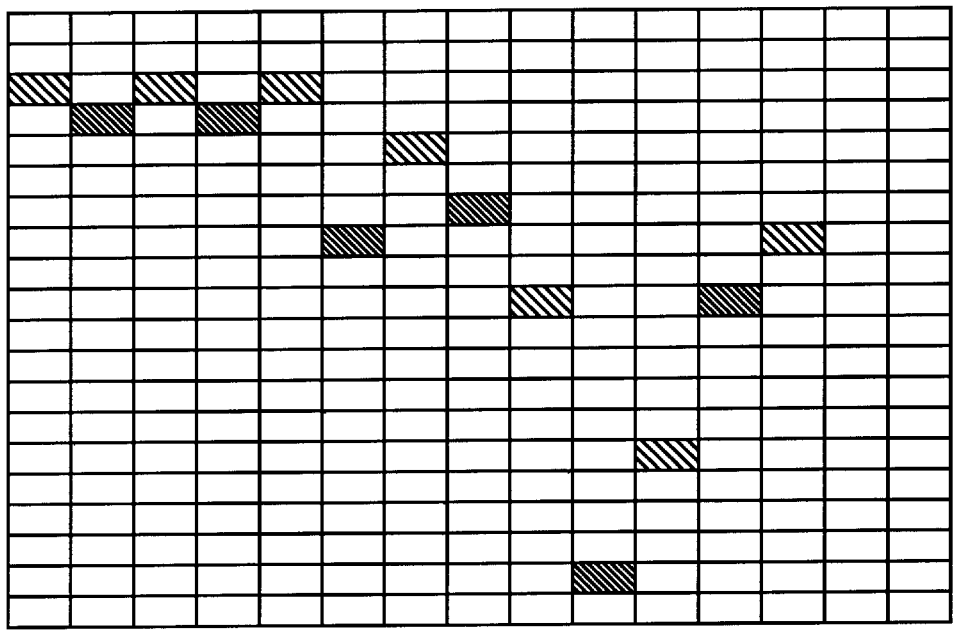
FIG. 4 illustrates a piano roll window for the melody (Für Elise) shown in FIG. 2.

FIG. 1 shows an example of a search interface according to the present invention. The interface includes piano roll grid 1, mouse or other pointing device cursor 2, play button 3, clear button 4, search button 5, and search result window 6. Piano roll grid I has vertical scroll button 1a and horizontal scroll button 1b. Even if a user does not know traditional musical notation, with this piano roll input, the user can easily input a melody to search. This kind of music input interface is already used in existing music notation software. For example, a commercially available product known as Midisoft Studio 6.0 utilizes a piano roll input interface. See, http://www.midisoft.cornmupgrade.htm. In this case however, the interface is used to create and edit music rather than to perform searches.

The horizontal axis of the grid represents time and the vertical axis of the grid indicates pitch. Each block represents a note. One block above represents a half note. If the current block is C, its upper block is C#.

Figure 8:
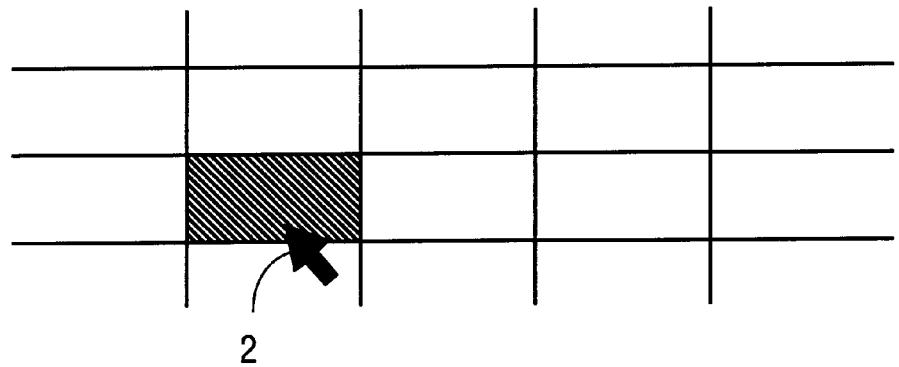
FIG. 8 illustrates a portion of the piano roll window showing the selection of a particular block representing a note.
Figure 9:
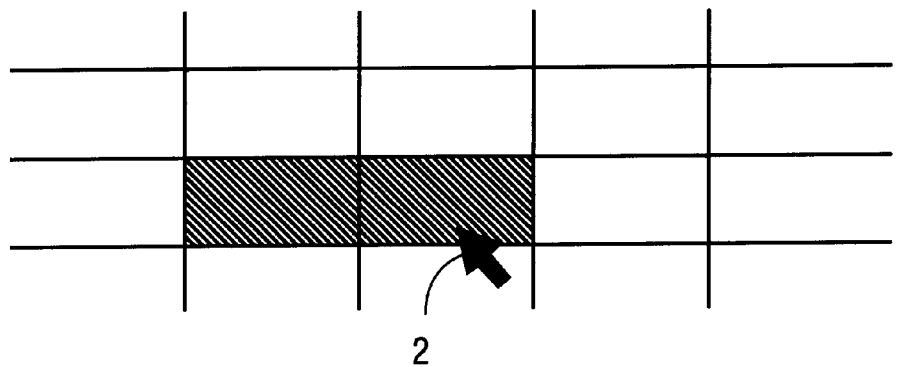
FIG. 9 illustrates a portion of the piano roll window showing the selection of a particular block representing a note with a duration twice as long as the note shown in FIG. 8.
Figure 10:
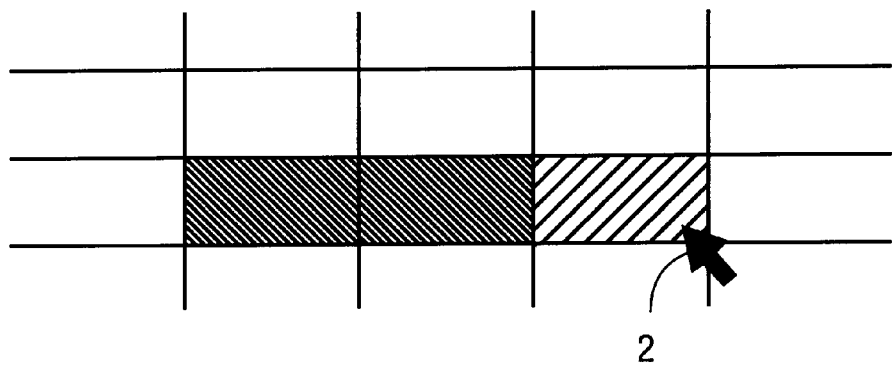
FIG. 10 illustrates a portion of the piano roll window showing the selection of a particular block representing a note twice as long as the note shown in FIG. 8 with a following note with the same pitch.

The user moves cursor 2 to a block to select it and then presses the mouse button. If the selected box pitch is C4, a tone of C4 will be generated by the soundcard of the PC and the user hears the tone. This tone feedback allows the user to correct the pitch easily. If the pitch is correct, the user releases the mouse button and that block is fixed. If the pitch is wrong, the user moves cursor 2 upward or downward to find the correct pitch. To correct a fixed block, the user moves the cursor onto the block and drags-and-drops it onto another block to correct the pitch. By dragging cursor 2 to the right, the user can prolong the duration of a note. For example, in FIG. 8, a block is chosen by moving cursor 2 onto it. In FIG. 9, by continuing to press the mouse button, the user drags cursor 2 to the next rightmost block and releases the button. These two blocks, which are solid, represent one note with duration 2. In FIG. 10, the third block is clicked. Because the mouse button has been released, this block, which is hatched, is detected as a following note with the same pitch. In this manner, the user inputs each note in the melody to search.

When the user finishes the melody input, play button 3 is clicked. The whole melody which has been entered is generated by the soundcard in the PC and is heard through connected speakers. If the melody is correct, search button 5 is selected to start the search. If the user wants to delete all entries made in the piano roll grid, clear button 4 is clicked.

In this search system, the duration of each note is ignored because it is difficult, if not impossible, for a user to input the correct duration. No rests (period of silence) are considered, either. For this reason, the user does not have to be concerned about the duration of each note. However, since it is easier for some users to enable each note to have at least an approximate duration to playback their input melody, if the user desires to input duration. such capability is provided. However, duration information is not used to perform a search.

Figure 5:
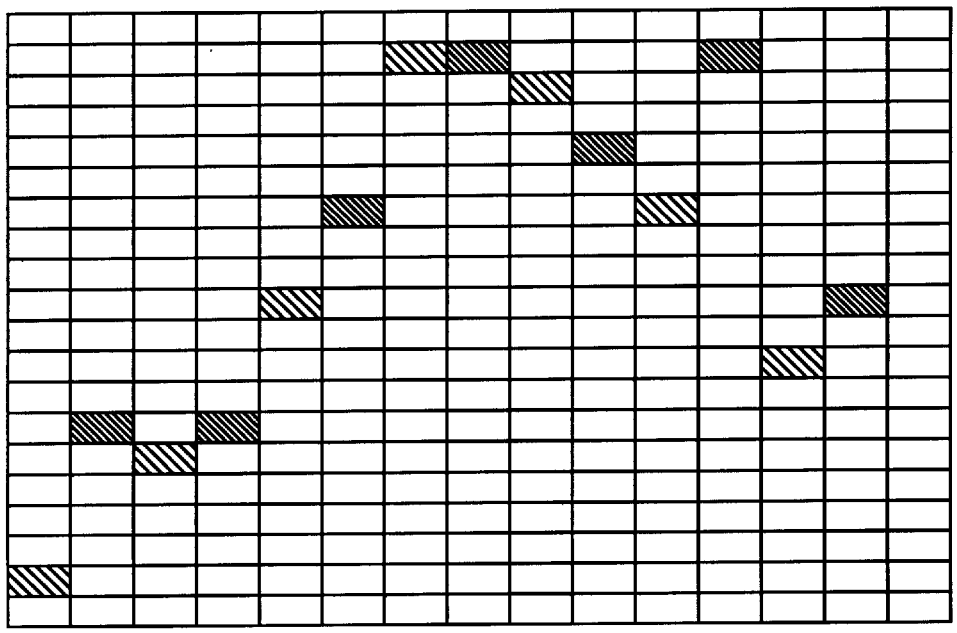
FIG. 5 illustrates a piano roll window for the melody (Träumerei) shown in FIG. 3.

FIG. 2 is the famous melody in "Für Elise" by L. V. Beethoven. FIG. 4 shows an example of piano roll notation for "Für Elise". FIG. 3 is another example melody. "Träumerei" by R. Schumann. FIG. 5 is the piano roll notation for this melody. The user may input the melody in any key. The invented search system automatically shifts its key to fit the data in the database as described in detail below. The user need only be concerned with pitch distance between each note.

Figure 13:
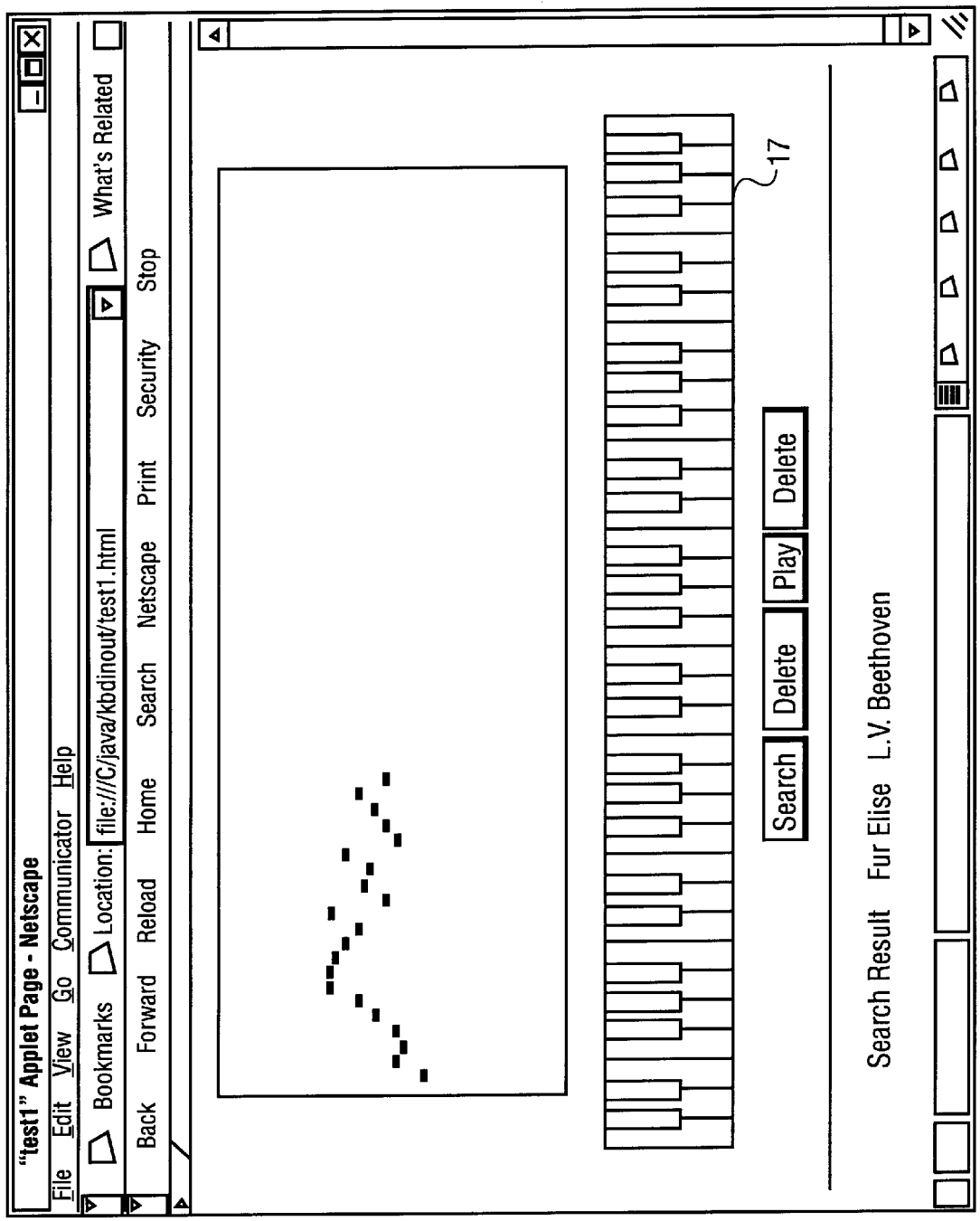
FIG. 13 illustrates an alternate interface for inputting a melody using a representation of a piano keyboard.

For those who are familiar with music notation, there are alternative input methods. A piano keyboard and a music sheet are displayed as shown in FIG. 13. The user chooses a key on keyboard 17 by pointing to the desired key with a cursor and clicking a mouse button. A corresponding note appears on the sheet 19. This kind of traditional input method may alternatively be employed. In this case, if a MIDI instrument is available. for example, a MIDI keyboard, it may be connected to the PC, and the user may enter a melody from the keyboard.

The invented keyboard (or piano arid) interface is designed for on-line access. In order to generate a tone of each piano key, the network server sends the sound files to the client computer over the network. The client computer does not have to store the sound files. They will be sent on demand in the preferred embodiment. There are several choices for sound files. One is a MIDI data file. The MIDI file has only a pitch and duration values. So its size is very compact. It can be accessed over a network relatively quickly. A disadvantage is that the client computer must have a MIDI sound generator. Most UNIX computers have no MIDI generator. Thus, although a MIDI file is small, using MIDI limits the number of clients that can be used. Another solution is a waveform file like a .au or .wav file which are well known sound file formats. Each waveform file is several Kbytes. 60-key data is about 250 kbytes. It is larger than a MIDI FIle and thus takes more time to send. However, no MIDI sound generator is required. Compared with a MIDI file, more clients can handle the waveform files.

Also, instead of a keyboard or piano grid input interface, a microphone can be used. The microphone receives the user's voice (e.g., by humming) and converts it to an electronic signal. The signal is amplified and analog-to-digital converted. The digitized signal is analyzed in a CPU by a FFT (Fast Fourier Transform) algorithm according to well known techniques in which FFT is used to analyze sound by obtaining frequency spectrum information from waveform data. The frequency of the voice is obtained and finally a musical note that has the nearest pitch is selected.

This kind of interface is already in practical use. For example, the following web pages describe software products with such an interface.

http://www.medianavi.co.jp/product/hana/tk9907.html
http://www.medianavi.co.jp/product/hana/step.html
http://www.medianavi.co.jp/product/hana/step2.html
http://www.medianavi.co.jp/product hana/step3.html Regardless of the input method employed, in the preferred embodiment. a user uses a browser, such as Netscape Navigator available from America on Line installed on the client computer and performs the following steps to do a search.

(1) The client requests the search engine web page (e,g.,. Java applet) over a network (e.g., the Internet).
(2) The web server receives the request and sends back the web page data which includes the user interface described above, which is for example a Java applei and sound files.
(3) T he client computer displays the web page. The user enters the melody to search using any of the above-described techniques or anv other suitable mechanism to enter the melody. The client computer sends the melody data to the web server.
(4) The web server passes the melody data to a CGI (Common Gateway Interface) script. The CGI script is, for example, a Perl (Practical Extraction Report Language) script, an example of which follows:

```
# Melody Search Program
if($ENV{QUERY_STRING}) {
    $entered = $ENV{QUERY_STRING};
}
@search_result = 'melody_search.exe @melody';
print "Content-type: text/html\n\n";
print "<html>\n";
print "<head>\n";
print "<title>Melody Search Result</title>\n";
print "</head>\n";
print "<body>";
print "<H2>Melody Search Result </H2>\n";
print "<br>";
if($ENV{QUERY_STRING}) {
    print "@search_result \n";
}
print "<br>";
print "</body>\";
print "</html>\n";
```

(5) The CGI script calls the search program (the invented peak search program described below) and gives the melody data to it.
(6) The search program searches the database and obtains the information about the entered melody.
(7) The search program returns the search result to the CGI script.
(8) The CGI script passes the result to the web server.

(9) The web server returns the search result to the client. The client browser displays it.

Most of the existing online search engines have a similar search process. The search engine as described is novel at least as to the following points.

(a) The web server provides a Java applet and sound files. So, the user can enter a melody while listening to playback. The user can use any Java-ready computer.
(b) Fast Peak search. The peaks in all the melodies stored in the databases are marked in advance. For melody matching, the entered melody is time-shifted, as explained below, so that its peak matches each peak in the reference melody.

The Music Melody Database

A composer's name and a music title are stored with its melody data in the database. If necessary, related information, for example, performers, history, background, can be linked to the database.

The melody data may be stored as a MIDI file. When searched, its melody is extracted from the MIDI file and compared with the input melody. If search speed does not matter, this is a good solution because the user listens to the searched music by playing the MIDI file. The melody stored in the database could be not only the beginning of the melody, but also one or more famous phrases in the middle of the music.

The following is an example of a database structure for storing the foregoing information in C language notation. Each melody data is grouped with its composer ID and its title ID as follows. Here, up to 64 notes are stored for a melody. Of course, the size of the array used to store the melody may be adjusted up or down as desired, depending on the amount of storage available.

```
struct melody_database {
    int composer_ID:
    int title_ID;
    int m[64]:
}
```

Thus, a music database for that has 5000 classical melodies would be defined as follows:

struct melody_database DB[5000];

Key Shift and Pattern Matching

Composer-ID list and Title-ID list are shown below. DB[0] is assigned for "Träumerei". 3650 is stored in DB[0].composer_ID. DB[0].title_ID is 1720. The search engine finds that the entered melody matches DB[0] and obtains these two Ids. Then they are referred to the lists and the composer's name "Schumann" and the title "Träumerei" are obtained.

Composer-ID list

| ID | Composer |
|---|---|
| 3600 | SCHEIN, Johann Hermann (1586–1630) |
| 3610 | SCHLICK, Arnolt (c. 1460–c. 1517) |
| 3620 | SCHOENBERG, Arnold (1874–1951) |
| 3630 | SCHUBERT, Franz Peter (1797–1828) |
| 3640 | SCHUBERT, Franz (1808–78) |
| 3650 | SCHUMANN, Robert Alexander (1810–56) |
| 3660 | SCHUTZ, Heinrich (1585–1672) |
| 3670 | SCRIABIN, Alexander (1872–1915) |
| 3680 | SERMISY, Claudin de (c.1490–1562) |
| 3690 | SGAMBATI, Giovanni (1841–1914) |

Title-ID list

| ID | Title |
|---|---|
| 1710 | Toccata, Op. 7 |
| 1720 | Träumerei (Kinderszenen Op. 15) |
| 1730 | Fantasia in C, Op. 17 |
| 1740 | Arabeske, Op. 18 |
| 1750 | Novelettes No. 6, Op. 21 |
| 1760 | Romance No. 2, Op. 28 |

A pitch number is assigned to each key as shown in Table 1.

TABLE 1

| Key | Value | Key | Value | Key | Value | Key | Value |
|---|---|---|---|---|---|---|---|
| C1 | 36 | C2 | 48 | C3 | 60 | C4 | 72 |
| C #1 | 37 | C #2 | 49 | C #3 | 61 | C #4 | 73 |
| D1 | 38 | D2 | 50 | D3 | 62 | D4 | 74 |
| D #1 | 39 | D #2 | 51 | D #3 | 63 | D #4 | 75 |
| E1 | 40 | E2 | 52 | E3 | 64 | E4 | 76 |
| F1 | 41 | F2 | 53 | F3 | 65 | F4 | 77 |
| F #1 | 42 | F #2 | 54 | F #3 | 66 | F #4 | 78 |
| G1 | 43 | G2 | 55 | G3 | 67 | G4 | 79 |
| G #1 | 44 | G #2 | 56 | G #3 | 68 | G #4 | 80 |
| A1 | 45 | A2 | 57 | A3 | 69 | A4 | 81 |
| A #1 | 46 | A #2 | 58 | A #3 | 70 | A #4 | 82 |
| B1 | 47 | B2 | 59 | B3 | 71 | B4 | 83 |

Peak Search

Träumerei starts with C3. which has value 60. The first 21 notes are represented as A[0][0 . . . 21]={60, 65, 64, 65, 69, 72, 77, 77, 76, 74, 72, 77, 67, 69, 70, 74, 65, 67, 69, 72, 67}.

Note that these absolute pitch values need not be stored in the database. A difference between two adjacent notes is stored to DB[ ].m[ ]. (When no index is given to an array m[ ], it indicates the entire data of the array.) If the database has absolute pitch data, an entered melody must be key-shifted to each melody in the database. This is very time-consuming. To avoid key-shift, absolute pitch data is converted to relative pitch data and used for matching. Relative pitch data is obtained by the next formula.

Absolute pitch data: $a[i]$ where $0 \le i < m$ and $m$ is the length of the melody.

Relative pitch data: $r[i] = a[i+1] - a[i]$ where $0 \le i < m - 1$.

Träumerei's relative pitch data is stored from DB[0].m[0] to DB[0].m[20].

DB[0].m[0 . . . 20]={5, −1, 1, 4, 3, 5, 0, −1, −2, −2, 5, −10, 2, 1, 4, −9, 2, 2, 3, −5}.

In DB[0].m[21] and later, fill data such as 9999, is stored. The length of melody in the database is flexible, which in the example, is up to 64 bytes. It should be long enough to uniquely identify the melody.

Figure 6:
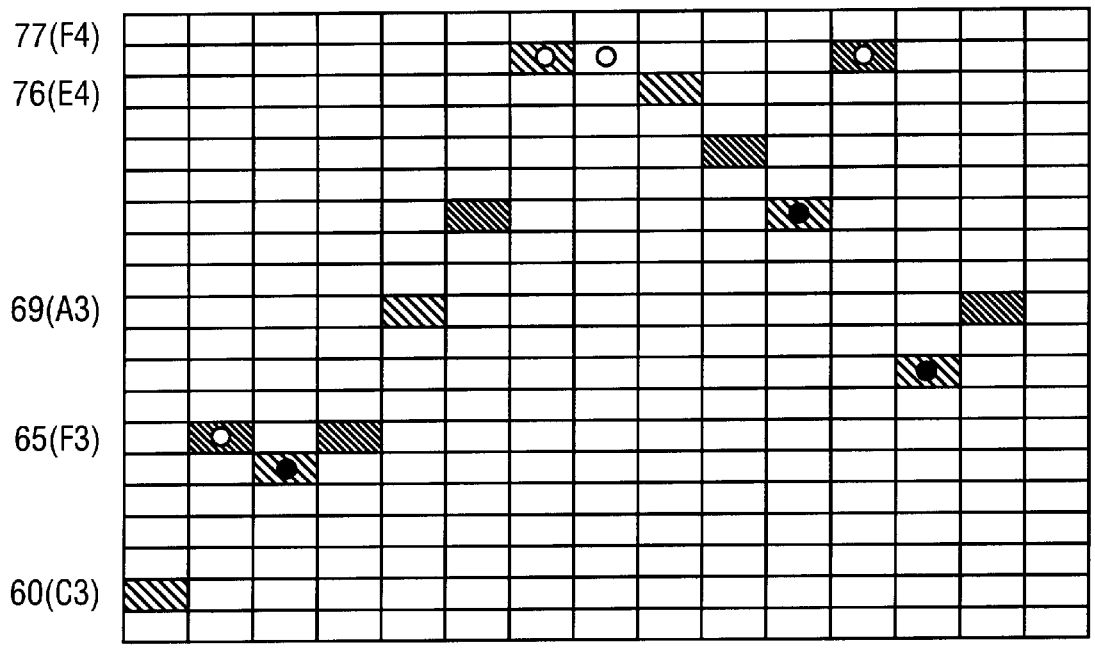
FIG. 6 illustrates Traumerei in piano roll notation.
Figure 7:
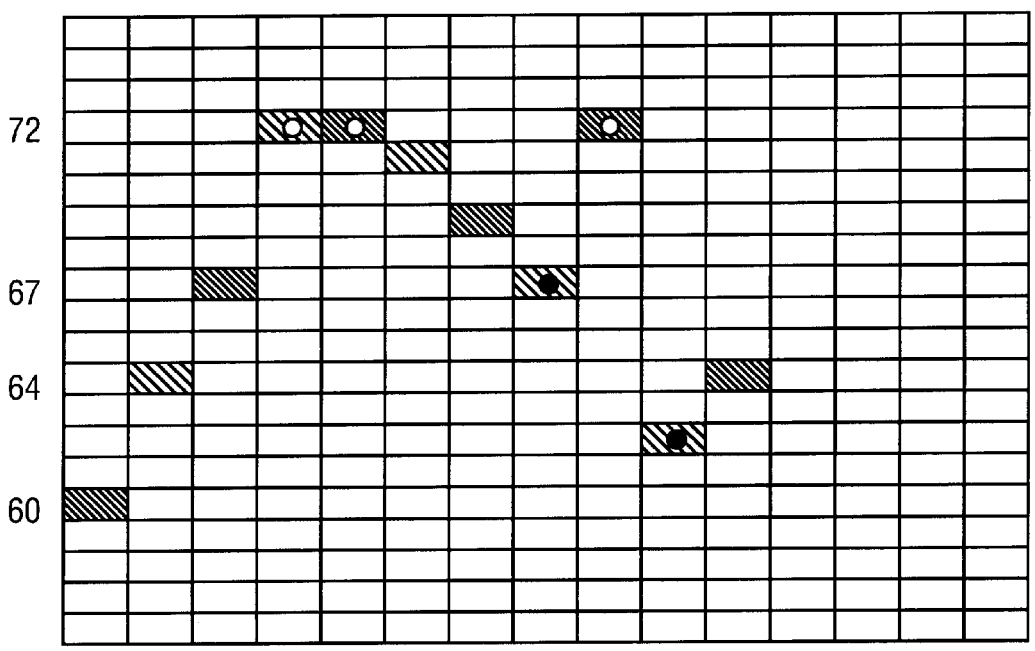
FIG. 7 illustrates user input for Träumerei in piano roll notation.

Peak notes are also detected and marked when the database is built. A peak note is defined as the note that is higher than or equal to each of the adjacent notes. When both of left and right note are equal to the note, i.e. when three consecutive notes have the same pitch, the center (second) note is not regarded as a peak. In FIGS. 6 and 7, a white dot indicates a peak note. In relative pitch notation, if the next value is positive or zero and the next value is negative or zero, the current value is marked as a peak. In case of a series of zeroes, only the first zero is marked. In the next representation, a peak is marked with an asterisk.

DB[0].m[0 . . . 20]={*5, −1, 1, 4, 3, *5, *0, −1, −2, −2, *5, −10, 2, 1, 4, −9, 2, 2, 3, −5}.

Similarly, the absolute pitch data of Für Elise is represented as

A[1][0 . . . 16]={76, 75, 76, 75, 76, 71, 74, 72, 69, 60, 64, 69, 71, 64, 68, 71, 72}. DB[1].m[0 . . . 15] will be DB[1].m bx;1[0 . . . 15]={−1, *1, −1, *1, −5, *3, −2, −2, −9, 4, 5, *2, −7, 4, 3, 1}.

Assume that the user inputs a part of Träumerei into the piano roll grid as shown in FIG. 7. The user may enter a melody in any key. The first note in FIG. 7 is C3, which is 60. (The actual pitch is F3.) Note that the user does not always enter a melody from the beginning correctly. In this case, the user has dropped the first three notes. The pitch data of the entered melody is as follows.

Ain[0 . . . 10]={60, 64, 67, 72, 72, 71, 69, 67, 72, 62, 64}.
The relative pitch data of Ain[ ] will be Rin[0 . . . 11]={4, 3, *5, *0, −1, −2, −2, *5, −10, 2}.

Next, Rin[ ] is time-shifted for matching. Rin[ ] will be compared to DB[0].m[ ]. Since the first peak in Rin[ ] is Rin[2].,Rin[ ] is time-shifted (i.e, moving the array to the left or right, as appropriate) so that Rin[2] locates in the position of DB[0].m[0].

{*5, −1, 1, 4, 3, *5, *0, −1, −2, −2, *5, −10, 2, 1, 4, −9,
2, 2, 3, −5}{4, 3, *5, 0, −1, −2, −2, *5, −10, 2}.
_____
        0 1 2 6 5 0 10 3

Each value below the line is an absolute difference of the two associated values. The values in un-overlapped area are neglected. The total absolute difference is

0+1+2+6+5+0+10+3=27.

When the two melodies completely match, the total absolute difference will be zero. The goal is to find a reference melody that gives the least total absolute difference. Again, Rin[ ] is time-shifted (in this case, moved to the right) so that Rin[2] and DB[0].m[5] match.

{*5, −1, 1, 4, 3, *5, *0, −1, −2, −2, *5, −10, 2, 1, 4, −9,
2, 2, 3, −5}{4, 3, *5, 0, −1, −2, −2, *5, −10, 2}.
_____
         0 0 0 0 0 0 0 0 0 0

This time, the total absolute difference is zero. The two melodies completely match. DB[0] is the melody the user is looking for. DB[0].composer_ID and DB[0].title_ID are returned as a search result. The result is indicated in search result window 6 in FIG. 1. In this manner, the entered melody is shifted to each peak in each reference melody and compared. The reference melody that gives the least difference is returned as a search result.

To accelerate the search, computation of the total absolute difference can be stopped when it exceeds a certain limit.

Linked Features

If this database is linked to a music database that has complete music score data, searched music may be played automatically. For example, DB[0].title_ID may be linked to the MIDI file of Träumerei . The server sends the MIDI file to the client PC and the client PC play it. Moreover, the result can be linked to the list Compact Disc on on-line CD shop. For example, all the CDs that includes Träumerei are shown on the display. By clicking one of them, it is sent to the shopping cart of on-line purchaser.

Variations

Instead of a peak, a dip can be used. A dip note is indicated with a black dot in FIGS. 6 and 7.

Also both peaks and dips may be used together. The number of peaks and dips in each reference melody are detected beforehand and a flag indicates which are fewer in number. Before matching, this flag is detected and it is decided which is to be used, peaks or dips. If dips are fewer than peaks, the entered melody is shifted so that the dip in the entered melody locates in the position of the dip in the reference melody. This method will save computation time because search time greatly depends on the number of matching peaks or dips required to be made.

Moreover, in order to further accelerate the search, the order of comparison may be considered for search speed improvement. It is most probable that the highest peak in the entered melody matches the highest one in the reference melody. Therefore, the highest peak is first compared with the highest one in the reference melody and next compared with the second highest peak. For example, in Träumerei, there are four peaks, DB[0].m[0], DB[0].m[5], DB[0].m[6], and DB[0].m[10]. Their absolute pitch value are A[0][1], A[0][6], A[0][7], A[0][11]. They are respectively, 65, 77, 77, and 77. The highest peak in Träumerei is DB[0].m[5], DB[0].m[6], and DB[0].m[10]. DB[0].m[0] is the second highest. The height order is stored in the database beforehand. The highest peak in the entered melody Rin[ ] is Rin[2], Rin[3], and Rin[7] are the highest and they are 72. For matching, the entered melody is shifted so that the Rin[2] locates in the same position of the highest peak DB[0].m[5], DB[0].m[6] and DB[0].m[10] respectively. After this match, the entered melody is shifted to the second highest peak DB[0].m[0].

Instead of using a peak , a differential between notes may also be used. The largest step-up in the input melody is detected. In relative pitch data DB[ ].m[ ], the largest value indicates the largest step-up. In case of Träumerei, DB[0].m[15] is the largest step-up, which is marked with a pound. The second largest step-up is marked with a double-pound. In this way, each step-up in the database is numbered in large step-up order.

DB[0].m[0 . . . 20]={##5, −1, 1, 4, 3, ##5, 0, −1, −2, −2, ##5, −10, 2, 1, 4, #9, 2, 2, 3, 5}

Each step-up in the entered melody is also marked in the same way when it is entered.

Rin[0 . . . 11]={4, 3, #5, 0, −1, −2, −2, #5, −10, 2}.

Figure 11:
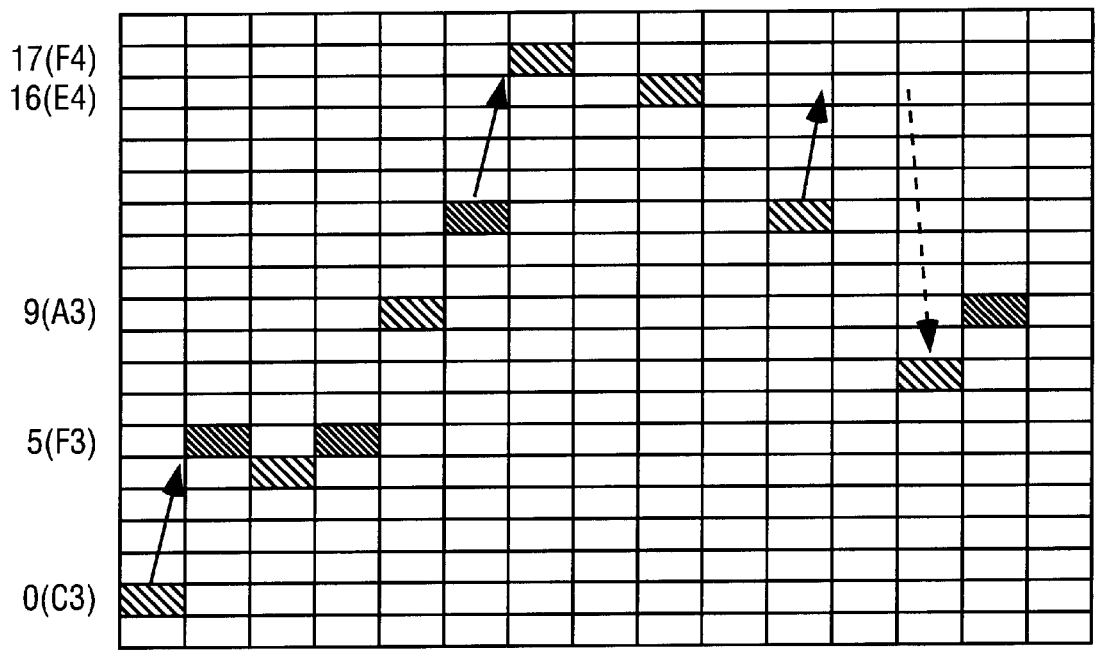
FIG. 11 illustrates user input for Träumerei in piano roll notation.
Figure 12:
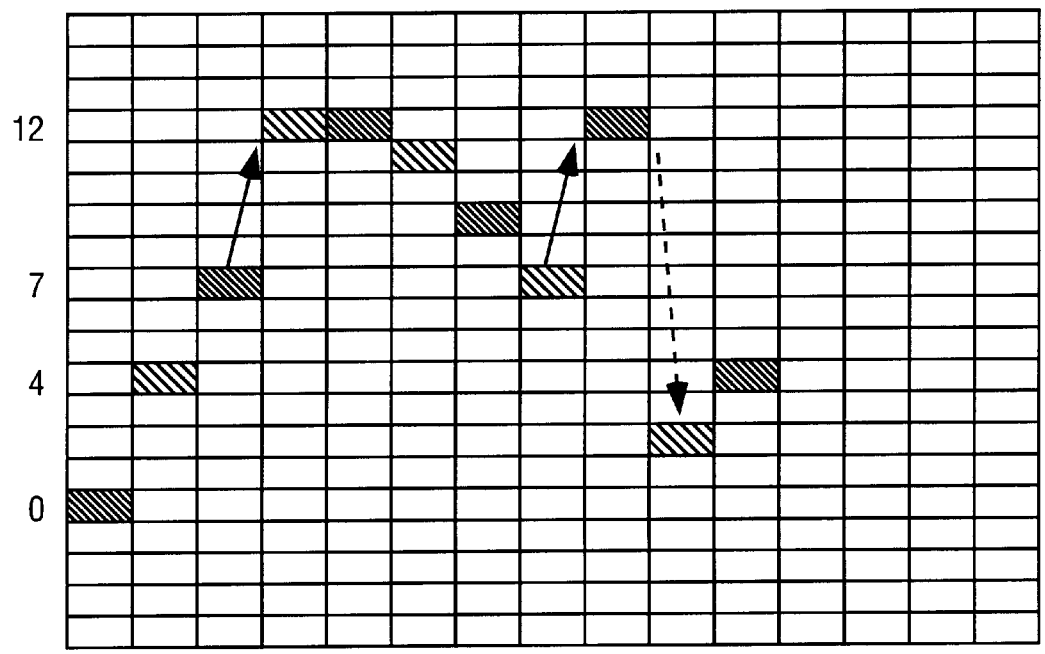
FIG. 12 illustrates user input for Träumerei in piano roll notation.

The entered melody is shifted so that the largest entered step-up locates at the largest step-up in the reference melody. The absolute difference between the two melodies are computed as described above. If the largest step-up is done, the entered melody is shifted to the second largest step-up (marked with a double-pound) in the reference melody. In this way, the entered melody is shifted to each step-up and compared. FIGS. 11 and 12 illustrate this step-up search. These figures have the same pattern as FIGS. 6 and 7 respectively. Solid arrows indicate the largest step-up in FIG. 12. It is five steps. Instead of step-up, step-down data can be used. In FIGS. 11 and 12, a dotted arrow indicates the largest step-down.

Instead of relative pitch data, the original absolute pitch data can be stored in the database and used for matching. The input melody is key-shifted so that the peaks in the input melody have the same pitch as each peak in the reference melody. This is done by comparing peaks in the input melody and reference melody, and then subtracting the difference from each subsequent note until the next peak, and then repeating for the second and each subsaequent peak. A disadvantage of absolute pitch data is that a key-shift is required for every matching. An advantage is original absolute pitch data can be stored without modification. Also a MIDI file, which includes pitch, duration, and other data, can be used although it takes time to analyze MIDI format.

Advantages of Peak Search (1) Search Speed

Peak notes are approximately 20% of the total number of notes in a typical melody. That means search speed using peak notes is 20% of a brute force search which shifts the entered melody, note by note. Also because relative pitch data is used, no key-shift is required to compare with each reference melody.

(2) No Restriction on Incomplete Input

The entered melody is shifted based on a peak note in the melody. Therefore, the user can start a melody with any note. In the above example, an exact result was obtained even though the first three notes of the melody were dropped. The only restriction is that an entered melody must include at least one peak.

(3) Input Fault Tolerance

The user does not always enter the melody without mistakes. Some notes could be dropped or given a wrong pitch. So a search engine should have some input fault tolerance. If a peak note is correctly entered, this search engine will find the closest melody from the database. Even if a peak has a wrong pitch, another peak can be used for the search. In the above example, assume Rin[2] has the wrong pitch. In this case, no exact result is obtained. So, another search will be done with the second peak Rin[7]. When Rin[7] is shifted to DB[0].m[10], the total absolute difference will be a minimum and the correct result will be obtained. (As described above, a dip can be used instead of a wrong peak.) For these reasons, a correct search can be obtained notwithstanding inaccurate input from the user.

(4) Flexibility on Search Area

Figure 14:
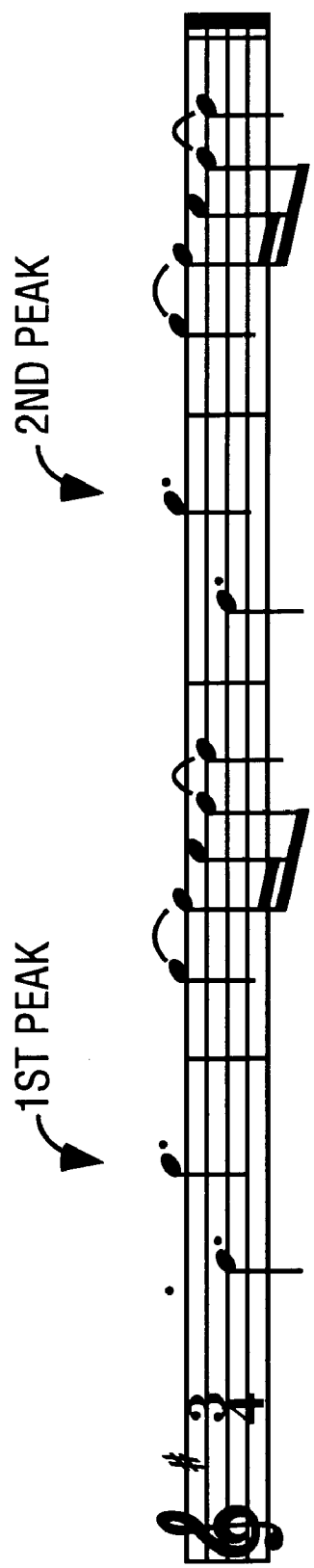
FIG. 14 illustrates a melody having a repeated pattern

Some melodies have a repeated pattern as shown in FIG. 14. In this melody, the second measure is identical to the first one. Two peaks are in the melody, but the second peak is not necessary to test because the user also enters the same repeated pattern. As described above, each peak in the database is marked when the database is built. In this peak-marking process, each repeated peak can be omitted. This omission avoids unnecessary searching and accelerates search speed. Also, a peak that is in an unimportant portion can be skipped. In a long music selection, there are some important portions that are indispensable to identify the melody. These portions are well recognized and remembered by the user. The user identifies such important portions as a keyword (key-melody). The other unimportant portions can often be ignored. Therefore, peaks in an unimportant portion can be omitted in the same way as a repeated peak. This omission also contributes to performing a fast search. Boyer-Moore (discussed below) or other string-matching algorithms do not have this kind of flexibility. They only search word by word from the beginning of the database to the end.

Alternative Search Method

A musical note can be represent as an integer like an ASCII character. Therefore, a melody data can be handled in the same manner as a character string. Fundamentally, a melody search is equivalent to string search. Of course, however, a key-shift is required for a melody search. There are many studies for fast and efficient string search techniques. For example, the Boyer-Moore algorithm is well-known as one of the best solutions. See http://orca.st.usm.edu/~suzi/ http://www-igm.univ-mlv.fr/~mac/DOC/B5-survey.html#pm.

Instead of the using these techniques to perform a string search, these search algorithms may be applied to perform melody searches.

Further Search With A Wildcard

When a regular search does not result in a good match, further searches using wildcards can be performed. In a string search, a wildcard like "?" is used instead of an uncertain character. The character "?" matches any character. For example, if it desired to find a three-letter word which starts with "a" and ends with "d", the search keyword entered would be "a?d". As a search result, "add", "aid", "and", etc. would be returned. Such a wildcard can be introduced to music search according to the present invention. A problem is that the user may not know what note of the entered melody is wrong. So, it is desirable that a search engine automatically searches with the modified input melody. The invented search engine also has such input fault tolerance capability.

First, in the case when string-search algorithm is used, assume that the user entered n notes as follows.

(a[1], a[2], a[3] . . . a[n])

The index of the array starts with 1 for simplicity. (Note that actual search uses not a[ ], but a relative difference between two adjacent notes.)

(1) Correction of a Wrong Pitch

The search engine assumes one of the n notes has a wrong pitch. The search engine replaces one of them with a wildcard and tries a search. There are n variations. The database is searched n times. The modified input melody is represented as follows.

(?, a[2], a[3], . . . a[n])

(a[1], ?, a[3], . . . a[n])

. . .

(a[1], a[2] . . . a[n−1], ?)

(2) Compensation for a Dropped Note

The search engine assumes one note has been dropped. The search engine adds a wildcard as a new note for further search. There are n+1 variations. The database is searched n+1 times. The modified input melody is represented as follows.

(?, a[1], a[2], a[3], . . . a[n])

(a[1], ?, a[2], a[3], . . . a[n])

. . .

(a[1], a[2], a[3], . . . a[n], ?)

(3) Removal of a Redundant Note

The search engine assumes one of the n notes is redundant. The search engine drops a note and tries further search. This has n variations. The search is repeated n times. The modified input melody is represented as follows.

(a[2], a[3], . . . a[n])

(a[1], a[3], . . . a[n])

. . .

(a[1], a[2], . . . a[n−1])

Totally, the further search takes 3n+1 times longer than the regular search. The invented method can be applied for two or more erroneous notes in the same way. If computational speed is fast enough, further search for two or more errors can be done.

For the peak search, more consideration is required. Depending on what note is modified, a decision must be made as to which peak is to be used for the search.

(4) Correction of a Wrong Pitch

Assume that a[2] is the original peak note. An asterisk indicates a peak.

(a[1], *a[2], a[3], . . . a[n])

The search engine assumes one of the n notes has a wrong pitch. It replaces one of them with a wildcard. When a note to be replaced is neither the peak nor the two adjacent notes, the peak will be still a peak after modification. Since a peak is defined only by two adjacent notes, modification to the other notes does not affect the original peak. So, the search will be done using the original peak. For example, even if a[n−1] is replaced with a wildcard, a[2] is still a peak. So, the modified melody can be shift so that a[2] locates at each peak of the reference melodies.

(a[1], *a[2], a[3], . . . a[n−2], ?, a[n])

In case a note to be replaced is either the original peak or the two adjacent notes. When another peak exists and the modification to these three notes does not affect that peak, it is possible to use it as a substitute peak. In the next example, let a[n−1] be another peak.

(a[1], *a[2], a[3], . . . a[n−2], *a[n−1], a[n])

Even after one of a[1] to a[3] is modified, a[n−1] is still a peak. So, a[n−1] will be used. What if such another peak does not exist? The original peak is used for the search although it might not be a peak after modification. (This is the worst case scenario.)

(5) Compensation for a Dropped Note

The search engine assumes one note has been dropped and adds a new note as a wildcard. This is similar to (4). If the newly added note is placed outside of the original peak and the two adjacent notes., the original peak is used. In the next example, the new notes are placed between a[n−1] and a[n]. That never affects a[1] to a[3]. So, search will be done using a[2].

(a[1], *a[2], a[3], . . . a[n−1], ?, a[n])

In case that a wildcard is placed next to the peak, if available, another peak is used. In the next examples, another peak a[n−2] is used for search.

(a[1], ?, *a[2], a[3], . . . a[n−1], *a[n−2], a[n])
(a[1], *a[2], ?, a[3], . . . a[n−1], *a[n−2], a[n]])

If no other peak is available, a[2] is used.

(6) Removal of a Redundant Note

The solution for this case is simple. After removing a redundant note, a new peak is found in the modified input melody. The new peak is used for the search.

The invented input fault tolerance function allows the user to obtain an exact result even when an entered melody has some errors. The user does not have to use a wildcard. When a regular search does not obtain a good match, the input melody is automatically modified with a wildcard and further search starts with the modified melody.

Conclusions

The invented melody search as described above has the following advantages.

A user can search a music title from its melody. No other information is required to be input.

The melody input is easy. No traditional music notation is required.

The user does not have to pay attention to the duration of each note. Only the pitch is used for the search.

A user can playback the input melody to verify, its correctness before performing the search.

This search engine is designed not only for stand-alone PC but also for on-line access over the network. The interface software is written in multi-platform language like Java. So a user can access the remote server with any computer. (Windows PC, Macintosh. UNIX, etc.)

Interface software including sound files are sent to the client from the server on demand. The client do not have to install any files in advance.

A fast search is performed by using a peak or differential matching algorithm.

The flexible nature of the search algorithm enables the searching of an incomplete melody. It has input fault tolerance.

When you build the database, by un-marking peaks you can select the portions that should not be searched. This avoids searching unnecessary portions and accelerates search speed.

The search result can be linked to its sound (MIDI) file. The user can immediately listen to its music.

The search result can be linked to on-line music shop. By clicking a CD list, the user can easily purchase the CD that includes the music.

The invented melody search provides a very useful, user-friendly and fast mechanism to search music. A user can obtain an exact music title from a melody and use the information to. for example, purchase its CD or tape.

I claim:

1. A method for searching for a musical piece which includes at least one melody comprising the steps of:
   a) receiving note information representing the melody provided by a user;
   b) converting the received information to a series of values corresponding to each received note information;
   c) calculating relative pitch values from said series of values
   d) comparing said relative pitch values to values stored in said database representing stored melodies;
   e) selecting as the musical piece being searched one of said stored melodies which produces a closest match based on said comparing.

2. The method defined by claim 1 further comprising the step of marking pitch peaks in said stored values and determining peak pitch values from said relative pitch values for said comparison step.

3. The method defined by claim 2 further comprising the step of time shifting said relative pitch values to match a first peak in said relative pitch values with a first peak in said stored values.

4. The method defined by claim 3 further comprising the step of time shifting said relative peak values to match subsequent peaks in said relative pitch values with corresponding subsequent peaks in said stored values.

5. The method defined by claim 4 wherein the closest match is determined by calculating absolute differences between said time shifted relative peak values and said stored values, said closest match being one have a smallest calculated absolute difference.

6. The method defined by claim 1 further comprising the step of marking pitch dips in said stored values and determining dip pitch values from said relative pitch values for said comparison step.

7. The method defined by claim 5 further comprising the step of time shifting said relative pitch values to match a first dip in said relative pitch values swith a first dip in said stored values.

8. The method defined by claim 7 further comprising the step of time shifting said relative dip values to match subsequent dips in said relative pitch values with corresponding subsequent dips in said stored values.

9. The method defined by claim 8 wherein the closest match is determined by calculating absolute differences between said time shifted relative dip values and said stored values, said closest match being one have a smallest calculated absolute difference.

10. The method defined by claim 1 further comprising the step of marking largest pitch differentials in said stored values and determining largest differential pitch values from said relative pitch values for said comparison step.

11. The method defined by claim 10 further comprising the step of time shifting said relative pitch values to match a first largest difference in said relative pitch values with a first largest difference in said stored values.

12. The method defined by claim 11 further comprising the step of time shifting said relative dip values to match subsequent largest differences in said relative pitch values with corresponding subsequent largest differenes in said stored values.

13. The method defined by claim 12 wherein the closest match is determined by calculating absolute differences between said time shifted relative largest difference values and said stored values, said closest match being one have a smallest calculated absolute difference.

14. The method defined by claim 1 wherein said note information is received from a user based on a piano roll grid interface in which cells within an array represent pitch values and are selected by a user using a pointing device.

15. The method defined by claim 1 wherein said note information is received from a user based on a piano keyboard grid interface in which keys on a piano keyboard represent pitch values and are selected by a user using, a pointing device.

16. The method defined by claim 1 wherein said note information is received from a user based upon sounds input to a microphone representing the melody.

17. The method defined by claim 1 farther comprising the step of playing said note information for verification of its correctness.

18. The method defined by claim 1 wherein note information includes at least one wildcard character.

19. The method defined by claim 1 further comprising the step of playing the selected musical piece.

20. The method defined by claim 1 further comprising the step of enabling the user to make an on-line purchase of the selected musical piece.

21. A method for searching for a musical piece which includes at least one melody comprising the steps of:
   a) receiving note information representing the melody provided by a user;
   b) converting the received information to a series of values corresponding to each received note information;
   c) adjusting said series of values by key shifting said values;
   d) comparing said key shifted pitch values to absolute pitch values stored in said database representing stored melodies;
   e) selecting as the musical piece being searched one of said stored melodies which produces a closest match based on said comparing.

22. The method defined by claim 21 further comprising the step of marking pitch peaks in said stored values and determining peak pitch values from said key shifted pitch values for said comparison step.

23. The method defined by claim 22 further comprising the step of time shifting said key shifted pitch values to match a first peak in said relative pitch values with a first peak in said stored values.

24. The method defined by claim 23 further comprising the step of time shifting said key shifted peak values to match subsequent peaks in said relative pitch values with corresponding subsequent peaks in said stored values.

25. The method defined by claim 24 wherein the closest match is determined by calculating absolute differences between said time shifted and key shifted peak values and said stored values, said closest match being one have a smallest calculated absolute difference.

26. The method defined by claim 21 further comprising the step of marking pitch dips in said stored values and determining dip pitch values from said key shifted pitch values for said comparison step.

27. The method defined by claim 21 further comprising the step of time shifting said key shifted pitch values to match a first dip in said key shifted pitch values with a first dip in said stored values.

28. The method defined by claim 27 further comprising the step of time shifting said key shifted dip values to match subsequent dips in said key shifted pitch values with corresponding subsequent dips in said stored values.

29. The method defined by claim 28 wherein the closest match is determined by calculating absolute differences between said time shifted and key shifted dip values and said stored values, said closest match being one have a smallest calculated absolute difference.

30. The method defined by claim 21 further comprising the step of marking largest pitch differentials in said stored values and determining largest differential pitch values from said key shifted pitch values for said comparison step.

31. The method defined by claim 30 further comprising the step of time shifting said key shifted pitch values to match a first largest difference in said key shifted pitch values with a first largest difference in said stored values.

32. The method defined by claim 31 further comprising the step of time shifting said key shifted dip values to match subsequent largest differences in said key shifted pitch values with corresponding subsequent largest differenes in said stored values.

33. The method defined by claim 32 wherein the closest match is determined by calculating absolute differences between said time shifted and key shifted largest difference values and said stored values, said closest match being one have a smallest calculated absolute difference.

34. The method defined by claim 21 wherein said note information is received from a user based on a piano roll grid interface in which cells within an array represent pitch values and are selected by a user using a pointing device.

35. The method defined by claim 21 wherein said note information is received from a user based on a piano keyboard grid interface in which keys on a piano keyboard represent pitch values and are selected by a user using a pointing device.

36. The method defined by claim 21 wherein said note information is received from a user based upon sounds input to a microphone representing the melody.

37. The method defined by claim 21 further comprising the step of playing said note information for verification of its correctness.

38. The method defined by claim 21 wherein note information includes at least one wildcard character.

39. The method defined by claim 21 further comprising the step of playing the selected musical piece.

40. The method defined by claim 21 further comprising the step of enabling the user to make an on-line purchase of the selected musical piece.

* * * * *